Dec. 1, 1942.  T. A. RICH  2,304,055
AMPLIFIER
Filed Jan. 22, 1942
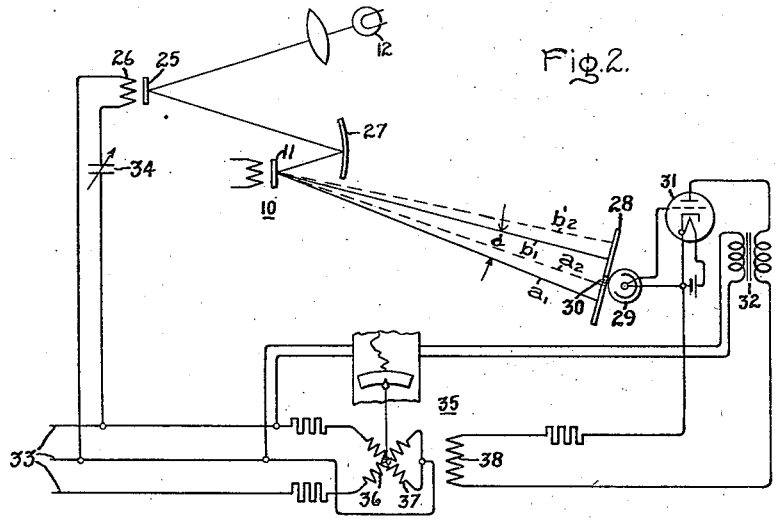
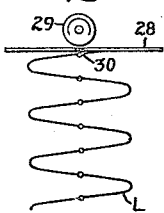
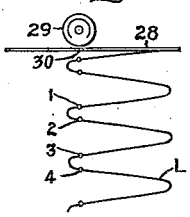
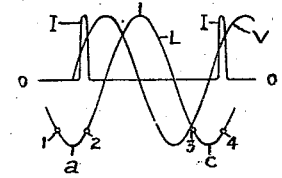
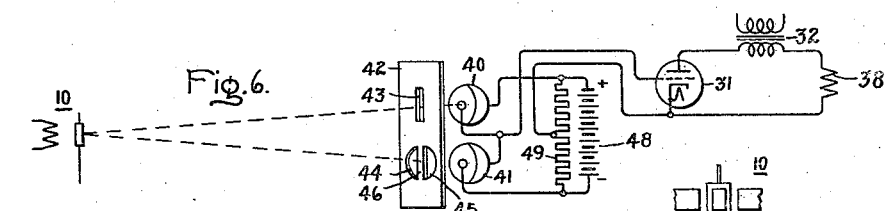
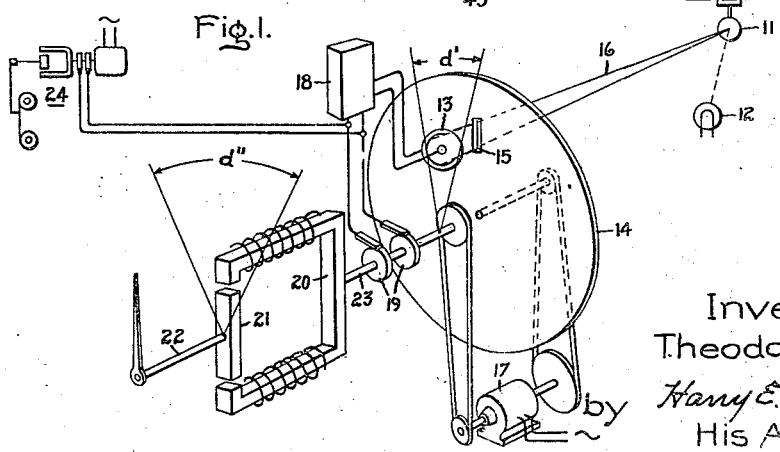
Inventor:
Theodore A. Rich,
by Harry E. Dunham.
His Attorney.

UNITED STATES PATENT OFFICE 2,304,055

AMPLIFIER

Theodore A. Rich, Schenectady, N. Y., assignor to General Electric Company, a corporation of New York Application January 22, 1942, Serial No. 427,813

6 Claims. (Cl. 171—95)

My invention relates primarily to apparatus for producing an amplified response corresponding to the indication or deflection of a sensitive measuring instrument and, if desired, to transmit the amplified response to a distant point.

As an example of an application of my invention let it be assumed that it is desired to produce a record of the deflection of a measuring instrument which because of its high sensitivity does not have sufficient torque to operate a curve drawing pen. My invention may be used to produce an amplified response of the sensitive measuring instrument in a receiver instrument having sufficient torque to produce an accurate record of the measurement. Likewise the angle of deflection may be amplified. The invention employs electric currents and hence these currents may be transmitted so that the high torque receiver instrument may be located any convenient distance from the sensitive measuring instrument.

The features of my invention which are believed to be novel and patentable will be pointed out in the claims appended hereto. For a better understanding of my invention reference is made in the following description to the accompanying drawing in which Fig. 1 represents a simple form of the invention employing a synchronous motor driven shutter interposed between a sensitive light beam instrument and a photocell amplifier. Fig. 2 represents another form of the invention wherein a vibrating mirror is used to vibrate a light beam across the shutter of a photocell amplifier to produce current impulses having a phase relation which varies with the deflection of a sensitive light beam deflecting instrument. The amplified response is reproduced by a high torque instrument which positions its moving element in response to the phase relation of the amplified impulses. Figs. 3 and 4 are curves representative of the vibrating light beam of the apparatus of Fig. 2 for different deflections of the sensitive measuring instrument. Fig. 5 represents by way of curves the phase position of impulses produced by the photocell amplifier of Fig. 2, and Fig. 6 represents a double photocell impulse device which may be used in Fig. 2 to increase the sensitivity.

Referring now to Fig. 1, 10 represents a sensitive low torque measuring instrument of any type which deflects over a small angle in response to some measurement. On its moving element it carries a mirror 11, and as the instrument deflects it moves a light beam from a light source 12 in a horizontal plane across a photocell 13, it being assumed that the range of deflection of instrument 10 will move the light beam across the effective width of the cell. Interposed between the cell 13 and instrument 10 is a shutter in the form of an opaque disk 14 having a radial slot 15 therein. The disk is driven by a synchronous motor 17 so that relative movement occurs between the shutter and light beam and the light beam 16 from mirror 11 to photocell 13 is cut off except during the instant when the slot 15 intercepts the beam once during each revolution of the disk. The electrical impulses thus produced in the photocell 13 are amplified by a current amplifier at 18 and are conducted through slip rings 19 to a revolving U-shaped electromagnet 20. As shown, the electromagnet is driven by the synchronous motor 17 but could be located at a distant point and be driven by a separate synchronous motor as represented at 24. Between the open ends of the U-shaped electromagnet 20 there is a magnetic armature member 21 mounted for rotation with a shaft 22 which is separate from but on the same axis of rotation as that of the shaft 23 of the electromagnet. When an impulse occurs due to light striking cell 13, electromagnet 20 is momentarily energized and, when so energized, pulls armature 21 into alignment between the poles of the electromagnet. Since the electromagnet is energized only for an instant during each revolution of disk 14, it may be visualized as being stationary during such instant. However, the phase position of the electromagnet at the instant it is energized will vary as the light beam 16 is deflected and the phase position of slot 15 varies to intercept the light beam. If the electromagnet 20 and disk 14 are driven at the same speed, the phase position of the electromagnet and that of the slot 15 in the disk 14 will vary over the same angle as the instrument 10 deflects. However, I may, and preferably do, rotate the electromagnet at a higher speed than disk 14 so that the phase range of variation of armature 21 will be amplified in comparison to the angular phase range of rotation of slot 15 over which it is effective to pass light flashes to the photocell as the instrument 10 deflects over its range.

Let us suppose, for instance, that the electromagnet 20 be driven at two times the speed of disk 14. Then, while slot 15 rotates over its effective angular range where it can control the passage of light to the photocell, electromagnet 20 will rotate through an angle twice as large. Also, the angle of deflection of instrument 10 may be amplified by placing it farther from the disk 14 than the photocell 13 is from the axis of rotation of disk 14. To illustrate this angular amplification by a specific example, let it be assumed that the instrument 10 has a range of deflection of 7½ degrees such as to vary the light beam through an angle $d$ of 15 degrees and is located twice the distance from disk 14 that the photocell is from the axis of rotation of disk 14. Then disk 14 will need to rotate through an angle $d'$ of 30 degrees in order to move slot 15 over the complete range of travel of the light beam on the photocell, it being assumed of course that the photocell is large enough or shaped so that it will intercept the light beam over such angle. The electromagnet 20 which is rotated at two times the speed of disk 14 then amplified this 30 degrees to an angle $d''$ of 60 degrees. It is thus seen that a deflection of 7½ degrees of instrument 10 is reproduced as a deflection of 60 degrees of armature 21. If magnet 20 be driven at four times the speed of disk 14, this final angle would be 120 degrees. The armature is positioned in accordance with the amplified deflection of instrument 10, one for each revolution of disk 14, and remains stationary over the deenergized period of the electromagnet. The receiving instrument comprising rotating electromagnet 20 and its armature 21 may be a high torque device since any degree of current amplification desired may be had at the amplifier 18. The shaft 22 may thus be used to operate a large pointer or curve drawing pen with accuracy and without difficulty. It is evident that the operation of this device is not influenced by variations in the brilliancy of the light source or changes in the characteristics of the electrical amplifier at 18. Also, variations in speed of motor 17 are unimportant so long as there is a synchronous tie between disk 14 and electromagnet 20. They must rotate in a fixed synchronous relation where magnet 20 makes an integral number of full revolutions for each revolution of disk 14. The bisector of angles $d'$ and $d''$ do not need to lie in the same direction from the axis of rotation but may extend in directions which are most convenient, and, in fact, magnet 20 and disk 14 do not need to have the same axis of rotation or to be located at the same station. Several receivers may be operated from the same transmitter and the different receivers may have different angles of amplification. For example, a recorder receiver such as is represented at 24 may have a 60 degree angle of operation and an indicating receiver may have a 120 degree angle of operation.

In Fig. 2, 10 represents the sensitive measuring instrument whose response is to be amplified. In this modification I provide a light ray system consisting of a light source 12, a vibrating mirror 25 vibrated by a vibrator coil 26, a curved stationary mirror 27, a mirror 11 which is deflected in accordance with the deflection of instrument 10, and a screen 28 which is placed in front of a light sensitive cell 29. The screen 28 has a small central opening 30 therein opposite the cell 29 and the light beam is vibrated back and forth across this opening by the vibrator 26 and its mirror 25. That is, the synchronizing movement between light beam and shutter is produced by vibrating the light beam. Fig. 3 represents the nature of the light ray vibration across the screen 28 past opening 30 therein when the instrument 10 is at the center point of its deflection. In this representation the wave L represents the light beam spread out with respect to time. Under the condition represented in Fig. 3 light beam flashes will reach the cell at the center of the swing of the beam at points designated by small circles on the light beam wave. When the instrument 10 deflects in one direction from its center, the vibrating light beam wave will be shifted in phase accordingly, as represented in Fig. 4, and flashes of light will strike the cell 29 at points displaced from the center of the wave proportional to the deflection of instrument 10 from center. The points where the light flashes reach the cell are designated as in Fig. 3, and certain of them are numbered 1, 2, 3, and 4 for future reference.

Associated with the cell 29 is a detector amplifier which may consist of several stages but which is represented by the tube 31. The amplifier is controlled jointly by the conductivity impulses of the cell 29 and an alternating voltage which is synchronous and has a fixed phase relation with the vibrations of vibrator 26. As represented, the cell 29 is connected between the cathode and grid of amplifier tube 31 so that the tube is biased and made conductive only when light strikes the cell 29. The plate output circuit of the tube 31 is energized from an $a$—$c$ source through a transformer 32. Transformer 32 is energized from the same phase of a polyphase $a$—$c$ source 33 which energizes the vibrator 26. It is now seen that amplifier tube 31 will pass current only when its plate voltage is positive and light strikes cell 29. Hence the amplifier produces current impulses which are synchronous with the vibrations of vibrator 26 and of a phase relationship which varies with the deflection of instrument 10. The resulting operation may be pictured as in Fig. 5.

L represents the vibrating light wave and V the $a$—$c$ voltage wave across tube 31. The constants of the vibrator circuit are made such that the phase of vibration of the light ray is approximately 90 degrees out of phase with the $a$—$c$ voltage impressed upon the amplifier as represented in Fig. 5. The small circles on the light wave in Fig. 5 represent the points where the light flashes strike the cell for the deflection represented in Fig. 4 and a series of such light flashes have been numbered 1, 2, 3, and 4 for identification purposes.

Now, it is seen when light flashes 1 and 3 strike the cell 29 the $a$—$c$ voltage wave V is negative and hence the amplifier does not pass current. However, when light flashes 2 and 4 strike the cell the voltage wave V is positive and the amplifier passes current which may be represented in Fig. 5 by the current pulsations I. It will now be evident that such current pulsations may occur over that part of the light wave cycle between points $a$ and $b$ in Fig. 5 where the voltage wave V is positive but may not occur over that part of the cycle of the light wave $b$ to $c$ where the voltage wave is negative. It will also be evident that the phase position along curve L from $a$ to $b$ where the current pulsations I will occur will depend upon the direction and extent of the deflection of instrument 10 from its central position. For instance the pulsations will occur near point $b$ for large deflections of instrument 10 in the opposite direction from that represented by points 1, 2, 3 and 4. If the instrument 10 be at the center of its range of deflection corresponding to Fig. 3, the current pulsations I will occur at the points where the light wave crosses the zero or center line O of Fig 5. Thus the amplifier is so controlled that it gives out current pulsations which vary in phase relation with respect to the voltage V in accordance with the deflection of instrument 10 over its complete deflection range such that the phase position of the impulses I identifies the deflection of instrument 10.

At 35 is a high torque receiver which measures the phase position of the current impulses I in terms of the measurement made by instrument 10. A standard power factor meter may be used for the receiver 35. It may consist of a moving coil system comprising coils 36 and 37 energized from different phases of the polyphase source 33 and with a stationary coil 38 energized by the amplified current pulsations I from amplifier 31. The moving coil system 36—37 produces a rotating field synchronous with the vibrations of mirror 25 but produces no torque except when coil 38 is energized. At the instances when coil 38 is energized, the rotating field in the moving coil system will align itself with the unidirectional stationary field produced by coil 38 turning the armature of this receiver to a corresponding position. Since the field 38 is energized at different phase positions of such rotating field established in accordance with the deflection of instrument 10, the receiver will reproduce the deflections of instrument 10. As pointed out in connection with Fig. 5, the phase position of the current impulses I may shift over a phase angle up to 180 degrees. Hence the range of deflection of the receiver may be 180 degrees although it is unnecessary that this complete range be utilized. It is evident that such range of deflection may correspond to a very much smaller angular range of deflection of instrument 10, for example the angle $d$, Fig. 2. The angular amplification in this respect may be readily changed by varying the amplitude of vibration of vibrating mirror 25 as by adjusting condenser 34. Increasing the amplitude of vibration of mirror 25 to increase the amplitude of oscillation of the light ray across the screen 28 will decrease the angular amplification. This may be visualized by assuming in Fig. 4 that the amplitude of wave L be increased without changing the deflection of instrument 10.

In the type of apparatus described in Fig. 2 the operation is not affected by ordinary variations in the brilliancy of the light source in the frequency of the source of a—c supply or expected changes in the amplifier tube and light sensitive cell characteristics.

A still more sensitive arrangement of the light sensitive portion of Fig. 2 may be employed as represented in Fig. 6 where the screen 28 and light sensitive cell 29 of Fig. 2 are replaced by a double screen and phototube arrangement. In Fig. 6, 40 and 41 represent phototubes. 42 represents a screen having a central slit 43 therein for allowing light to strike tube 40, and a pair of slits 44 and 45 separated by a solid central screen part 46 for controlling the light which strikes phototube 41. The arrangement is such that as the light beam from instrument 10 sweeps across the screen in a horizontal direction as in Fig. 2, light will strike cells 40 and 41 alternately. Light strikes phototube 40 in the same way as it strikes cell 29 in Fig. 2, whereas light strikes phototube 41 when it is cut off from phototube 40. Except for the use of a light beam of sufficient vertical dimensions to sweep across both phototubes in Fig. 6, the vibrating light beam system is the same as in Fig. 2. 48 represents a direct current source of supply connected across a resistance voltage divider 49. The phototubes are connected in series across the resistance. The mid-connections between the phototubes and the middle point of the resistance are connected between the filament and grid of the detector amplifier tube 31. When tube 40 is lit the positive end of the source 48 is in effect connected to the grid of tube 31, and when tube 41 is lit the negative end of the source 48 is in effect connected to the grid of tube 31. Hence, tube 31 is biased so as to be conductive only when tube 40 it lit. The plate circuit of amplifier 31 is supplied from an a—c source as before so that it passes current only when the voltage across it is positive and photocell 40 is lit. The arrangement of Fig. 6 provides a somewhat sharper light sensitive control. The apparatus and its operation will in other respects be similar to that of Fig. 2.

What I claim as new and desire to secure by Letters Patent of the United States, is:

1. In combination a sensitive measuring instrument of the deflection type, a high torque electrical instrument and means for controlling energization of the high torque instrument so that it deflects in proportion to the deflection of the sensitive measuring instrument, comprising a light source, a light sensitive device, a mirror moved by the sensitive instrument in response to its deflection for reflecting a light beam from said light source towards the light sensitive device, a shutter interposed in the path of said light beam, said shutter having an opening through which the light beam may strike the light sensitive device, synchronous operating means for producing relative movement between said shutter opening and said light beam whereby the beam is caused to strike the light sensitive device intermittently and in a phase relation with respect to said synchronous operating means which varies with the deflection of the sensitive instrument, current amplifier means controlled by said light sensitive device for producing current impulses, connections for causing said current impulses to energize said high torque instrument, and means for establishing a synchronous tie between said synchronous operating means and high torque instrument whereby the latter is actuated in response to said current impulses in accordance with the phase relation established by the deflection of the sensitive measuring instrument.

2. Apparatus for amplifying the measurement response of sensitive measuring instruments comprising in combination with such an instrument of the deflection type, a high torque electrical instrument having a rotating field, apparatus for projecting a light beam, a mirror rotated by the sensitive instrument for deflecting the light beam in proportion to the deflection of the sensitive measuring instrument, a light sensitive cell, means operating in a synchronous relation with the rotating field of the high torque instrument for causing the light beam as deflected by the sensitive measuring instrument to energize the light sensitive cell intermittently, a current amplifier controlled by said cell and correspondingly intermittently energizing the high torque instrument, the intermittent operation of the light sensitive cell and amplifier occurring in a synchronous relation with the rotating field of the high torque instrument for a constant deflection of the sensitive measuring instrument but varying in time phase relation with respect to such synchronous relation with variations in the deflection of the sensitive measuring instrument, said high torque instrument having a rotary member positioned in accordance with such varying phase relation each time the high torque instrument is intermittently energized.

3. Apparatus for amplifying the response of sensitive measuring instruments comprising in combination with such an instrument of the deflection type a light sensitive cell, a light source, a mirror rotated by the sensitive instrument for projecting a light beam towards said cell and varying the beam position as the instrument deflects, a disc having a small opening therein positioned in the path of such light beam, motor means for rotating the disc such that the opening therein allows the light beam to strike the cell intermittently and in a phase relation with respect to the rotary position of the disc which varies with the deflection of the sensitive instrument, a current amplifier controlled by said cell for producing current impulses when the light beam strikes the cell, a high torque electrical instrument having a field member rotated in a synchronous relation with said disc, which field member is energized by the current impulses from said amplifier, and a rotary member for the high torque instrument which is positioned when such field member is energized to reproduce an amplified deflection of the sensitive measuring instrument.

4. Apparatus for amplifying the response of sensitive measuring instruments comprising in combination with such an instrument of the deflection type, a light sensitive cell, a light source, a light reflecting system including a mirror on the deflecting part of the sensitive instrument and a vibratory mirror for directing a beam of light from said source towards said cell such that the light beam strikes the cell in a synchronous relation with the vibrations of the vibrating mirror when the sensitive measuring instrument is stationary and in varying time phase relation with respect to such vibrations in accordance with the deflections of the sensitive measuring instrument, a current amplifier for producing current impulses controlled by said cell, a high torque electrical instrument of the deflection type having stationary and rotary members, a source of alternating current for operating the vibrating mirror, energizing the amplifier and one member of the high torque instrument and forming a synchronizing tie between them, and connections for energizing the other member of the high torque instrument by the current impulses from said amplifier.

5. Apparatus for amplifying the response of sensitive measuring instruments comprising in combination with such an instrument of the deflection type, a light source, a light sensitive cell, a screen having an opening interposed between said light source and cell, a light beam reflecting system interposed between said light source and shutter including an electrically vibrated mirror for vibrating the light beam across the opening in the shutter and a mirror deflected by the sensitive instrument for shifting the vibrating light beam in the direction of its vibrating amplitude in accordance with the deflections of such instrument such that the light beam strikes the cell in a synchronous relation with the vibrations of the vibrating mirror but in a time phase relation which varies with the deflection of the sensitive instrument, a current amplifier for producing current impulses controlled by said cell, a high torque instrument having stationary and rotary field windings, one of which is energized by the current impulses from said amplifier, and a source of alternating current for energizing the other field winding of the high torque instrument, the amplifier and the vibrating mirror and establishing a synchronous tie between them, whereby when the high torque instrument is energized by the current impulses from the amplifier it produces a rotary deflection proportional to and representative of the deflection of the sensitive measuring instrument.

6. Apparatus for amplifying the response of sensitive measuring instruments comprising in combination with such an instrument of the deflection type, a pair of light sensitive cells, a light source, a screen interposed between said light source and cell having openings arranged for allowing light from said source to strike said cells alternately, a light ray reflecting system between said light source and cell including an electric vibratory mirror for sweeping the light across said screen such that light may strike the cells alternately in a synchronous relation with the vibrations of the vibratory mirror and a mirror on the deflecting element of the sensitive instrument for shifting the light beam in the direction of its vibrating amplitude such that the time phase relation of the light which strikes the cells varies with such deflection, a current amplifier of the space discharge type for producing current impulses, connections between said cells and amplifier for controlling the latter such that one cell controls the cut-off and the other cell controls the triggering of said amplifier, a high torque phase angle measuring instrument having stationary and rotary winding members, a source of alternating current supply, connections for energizing the vibrator, amplifier and one winding member of the high torque instrument from said source and establishing a synchronous tie between them, and connections for energizing the other field winding member of the high torque instrument by the current impulses from said amplifier.

THEODORE A. RICH.